May 23, 1961 H. WEHDE 2,985,713

MAGNETIC RECORDING AND SCANNING DEVICE FOR TV SIGNALS

Filed Dec. 16, 1957

Inventor:
HEINZ WEHDE
BY Eric D. Fraenkel
PATENT AGENT

United States Patent Office 2,985,713

Patented May 23, 1961

2,985,713

MAGNETIC RECORDING AND SCANNING DEVICE FOR TV SIGNALS

Heinz Wehde, Hamburg-Rissen, Germany, assignor to Telefunken G.m.b.H., Berlin, Germany Filed Dec. 16, 1957, Ser. No. 703,187

Claims priority, application Germany Dec. 20, 1956

4 Claims. (Cl. 178—6.6)

The present invention relates to a device for magnetically recording and scanning TV-signals on a storage tape having a plurality of recording tracks adjacent one another.

The main difficulty in recording signals magnetically arises from the necessity of feeding the tape at high velocity past the recording heads or playback heads, respectively. The high velocity is necessary if the signals to be recorded or to be played back have a wide frequency range. Such signals are used in TV technique. Several proposals have been made for decreasing the necessary tape velocity. For example, the TV spectrum may be divided into several bands, each band having a narrow band width. Every single band is then transformed into ranges of lower frequency, which transformed bands are recorded on several parallel tracks of the storage tape. However, difficulties arise when it becomes necessary to recombine the previously divided bands to reform the initial composite signal, because of phase distortions at the limits of the divided bands, which phase distortions will distort the TV picture.

It has also been known per se to record the signals transversely with respect to the movement of the storage tape by means of rotating recording heads and rotating playback heads, respectively. However, in using this method, considerable difficulties arise because of lateral shrinking of the recording tape.

It is an object of the present invention to provide a device for recording and playing back TV signals, said device overcoming the above-mentioned difficulties.

It is another object of the invention to provide means for recording TV signals on a storage tape using a plurality of parallel tracks longitudinally disposed with respect to the movement of said tape.

It is still another object of the invention to engage each one of a plurality of recording heads and playback heads, respectively, with a storage tape in cyclical succession.

It is an additional object of the present invention to provide a plurality of magnetic heads adapted for recording and playback and each head corresponding with one of a plurality of recording tracks on a storage tape.

Broadly, the invention comprises means for applying in cyclic succession a plurality of magnetic heads to a wide storage tape adapted to carry signals in a plurality of adjacent tracks, wherein each magnetic head coacts with the tape until the next head is applied to the tape. The magnetic recording and playback heads are positioned in reverse order around the circumference of a common drum. The length of contact of the tape around the periphery of the drum is coextensive with the distance between two recording heads.

However, such a device may suffer from the disadvantage that the recording or playback may be interrupted while passing from one track to the next adjacent track. In order to avoid this disturbance, the distances between adjacent magnetic heads, the velocities of the recording heads, and the velocity of the tape itself are selected in such mutual relationship that an integral number of TV picture lines are recorded during the interval between successive changes of the track. Such a relationship assures that the change from one track to the next one will occur during the return trace of the scanning beam of the TV receiver or transmitter, so that transient disturbances do not appear in the picture.

In addition, care must be taken that the track-changing occurs only during the return trace of every other TV picture scanned as a partial picture where the usual method of interlaced scanning is employed. This condition can be fulfilled by selecting the number of tracks and recording heads to be equal to the number of picture lines rounded off to the next integral number. Furthermore, the magnetic heads are positioned around the circumference of a rotating drum and have equal mutual angular displacements. The angular distance between the head associated with the last line of one partial picture and the head associated with the first line of the next partial picture is equal to a fraction of the other head spacings, said fraction being equal to the spacing required to make the total number of equal spacings come out to be an even integer. Such provision assures that one revolution of the drum corresponds exactly to the scanning time of a partial picture, even if the number of lines of the partial picture is not an integer.

According to a preferred embodiment of the invention, the change from one track to the next one should take place after the end of every one of the scanned TV lines, i.e., the number of parallel tracks is equal to the number of lines of a partial picture rounded off to the next higher integral number. The standard of picture signals in the United States is 237½ lines for each partial picture; therefore, 238 scanning and recording heads are provided according to the invention. Preferably, the magnetic recording and scanning heads are equally distributed over the circumference of the drum along a helical line.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
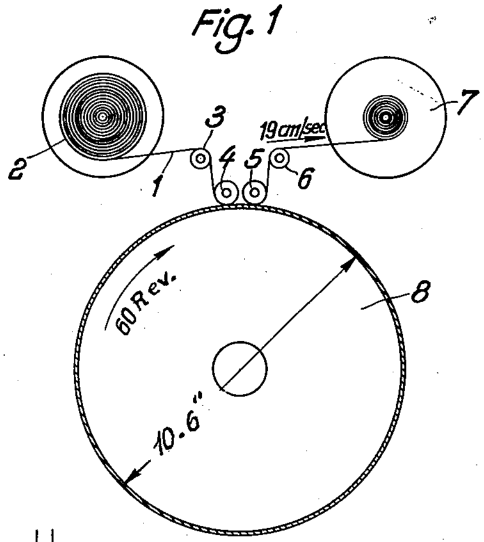
Figure 1 shows schematically a front view partially in section of a magnetic recording and playback device.

Referring in more detail to the drawings, a recording tape 1 is guided from the feed reel 2 over guide rollers 3, 4, 5 and 6 to the take-up reel 7. The driving means is conventional and is not shown in the drawing. The speed may be 19 cm./sec. which is approximately equal to 7.5″/sec. The tape 1, having a magnetizable coating, is held against the circumference of a rotating drum 8 by means of the guide rollers 4 and 5. The drum 8 may rotate, for example, at 60 revolutions per second. Magnetic recording heads are arranged and positioned on the circumference of the drum in such a manner, that they form a composite helical line 9. In case of a magnetic core width for each head of 0.25 mm.

$$\left(\approx\frac{1''}{100}\right)$$

and a spacing between adjacent tracks of 0.05 mm.

$$\left(\approx\frac{1''}{500}\right)$$

the 238 tracks in parallel on the surface of the drum 8 require a total width for the tape of approximately 7.15 cm. (≈2.85″). Additional space may be provided for recording a sound track and for a separate track for synchronizing pulses transmitted separately during the change from one track to the next track of the picture recording tracks. It has been found that 1000 waves pro millimeter may be recorded without risk of mutual distortion. Thus, the desired band width of 4.5 mc. of the signal to be recorded results in a relative velocity between the recording heads and the tape of 45 m./sec. (≈1771.2″/sec.) if the air gap in the magnetic core of the recording head is approximately 6–7$\mu$. From this calculation, it follows that the drum circumference is approximately 84 cm. and has a diameter of approximately 27 cm. (10.6″). The wave, representing the signal from one picture line, will be recorded on the magnetic tape for a peripheral distance of $$\frac{45\cdot 1000}{15250}=2.8 \text{ mm. } (0.11'')$$

The signals may be either fed to, or derived from, the magnetic heads, depending upon whether recording or playback is in progress. From this purpose, collector means, such as conductive segments, must be provided in such a manner, that every magnetic head is connected to one associated collector segment rotating in synchronism with the drum. A brush element having a fixed position relative to the rotating drum interconnects successively the collector segments with the associated external electrical circuit (not shown) of the recorder or the playback device. The terms collector segments and brush element are analogous in meaning to the meaning they have in the motor and generator arts; however, it is to be noted that common collectors used for dynamos and motors may not be used in the device according to the invention, because of the high revolution rate and because the currents to be transmitted are very small in such tape recorders. Accordingly, every collector segment and every brush element is in the form of an inductance, which brush and collector members are coupled inductively. Depending upon the position of the segments on the rotating drum, the coupling occurs in succession between the one fixed brush element and all of the collector segments. Preferably, these inductances are provided with ferro-magnetic cores, so that the two inductances coupled during a particular time interval form a transformer having two air gaps, but having a substantially continuous iron path.

Figure 2:
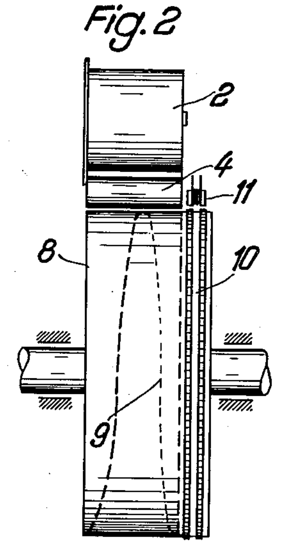
Figure 2 is a side view of the device shown in Figure 1.
Figures 3, 4:
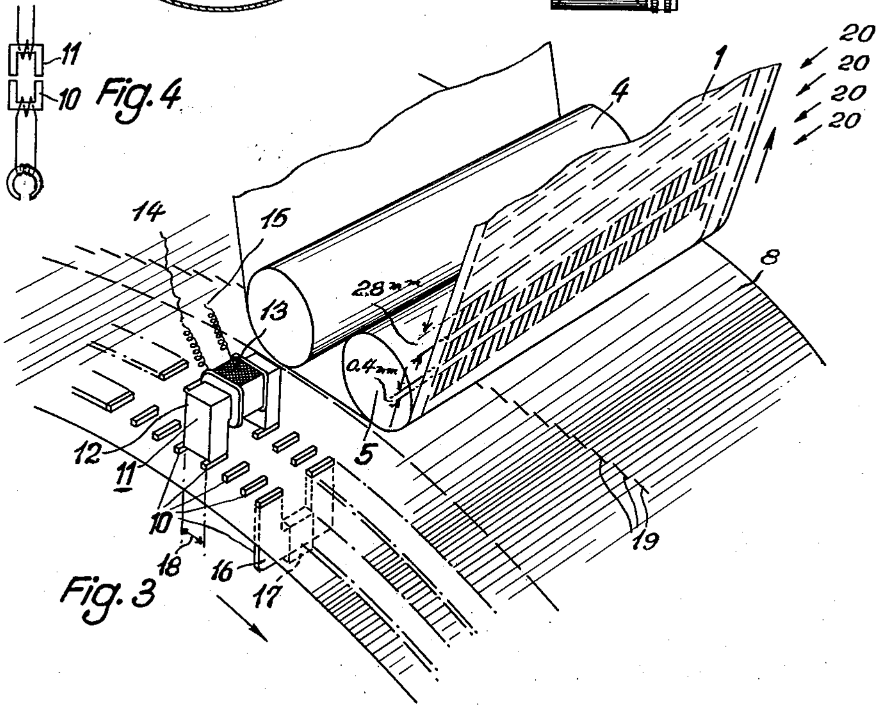
Figure 3 shows an enlarged perspective view of a part of the drum according to the invention.
Figure 4 shows an electric circuit coupling to one of the magnetic heads according to the invention.

Such structure is schematically shown in Figures 2 and 3. In Figure 2, the collector segments 10 are shown schematically at the right side of the drum 8. Figure 3 illustrates in a perspective view of the drum the cooperation between a brush element 11 and the collector segments 10. The brush element 11 comprises a core 12 upon which a coil 13 is wound. This coil 13 is connected to a circuit via terminals 14 and 15. Each of the collector elements also comprises a core 16 having a coil 17 mounted thereupon. Electrical connection is made between the coil 17 of every one of the collector elements 10 and the magnetic head associated with that collector element. This electrical connection is not shown, as it is of a common type. The magnetic heads are schematically indicated by dash lines 19 which are representative of the air gap in the core of every head. Assuming the device is operating for playback, the coils 17 are primaries of a transformer comprising, in addition, the core 16 which is inductively coupled with the core 12, and the coil 13 is then the secondary of that transformer. Coil 13 remains the secondary until, due to rotation of the drum 8, the primaries change. In case of recording, coil 13 will be the primary and every coil 12, just under coil 13, will be a secondary.

According to the invention, the operative primary changes just after one line is completely scanned. Thus, the width 18 of the core 12 is proportioned in such a manner that, during rotation of the drum 8, one of the cores 16 is receding just when the following one of the cores 16 enters the coupling range of the core 12. Each one of the collector segments 10 is connected to one magnetic head 19, as shown in Figure 4.

In order to provide accurate switching after every TV-line, it will be advantageous to arrange two rows of collector segments in parallel along the edge of the drum 8 and the collector elements associated with successive magnetic heads will be positioned alternatively in one row or the other, respectively. The number of switching gaps is doubled due to such an arrangement and, by means of an electronic switch, the two rows can be switched into the circuit alternatively. This switching is synchronized with the rotating drum 8.

Assuming the velocity of the tape is 19 cm./sec., while the cylinder rotates at 60 rev./sec., the recording on the tape 1 forms a diagonal pattern, as indicated in Figure 3. Each one of the stripes 20 contains the signals representing one partial picture. The width of the stripe is calculated to $$\frac{190}{60}=3.2 \text{ mm.}$$

Accordingly, if the length of one picture line is 2.8 mm. (.11″), a gap of 0.4 mm. (.016″) will remain between two stripes representing two different partial pictures.

However, as mentioned above, the invention is not limited to the embodiments shown in the drawing, wherein the number of magnetic heads is identical with the number of lines of a partial picture. It may be possible to use a lesser number of magnetic heads and to record several TV lines one after the other on a single-track width. The invention is not limited to the figures and proportions used above to explain a particular embodiment.

A TV program of approximately two hours length can be stored in an apparatus in which the diameter of the tape storage reels used does not exceed the diameter of tape reels conventionally used. The tape velocity is selected so that on the same tape a sound track may easily be recorded, said sound track having a frequency range up to 15 kc. and is recorded by conventional audio means. The wear on the heads is relatively little, although the relative velocity between the tape and the heads is high, because the heads are in contact with the tape only during a small period of time.

I claim:

1. A device for magnetically recording and scanning TV signals representing a picture raster having a definite number of lines on a storage tape on an integrally related number of adjacent parallel tracks disposed longitudinally of the tape, said device comprising: means for linearly advancing said tape; a rotary drum mounted tangent to the tape; a plurality of magnetic heads equal in number to the number of tracks and fixed in transversely offset annular succession around the surface of the drum, the heads being transversely out of alignment and coacting one at a time with the tape; drive means advancing the tape in contact with the drum; drive means rapidly rotating the drum on the tape at a rate such that within each longitudinally adjacent transverse zone of the tape all of the heads will be brought in cyclic succession into contact with said tape, each of said heads remaining in contact with its track on the tape substantially until the next successive head contacts another track on the tape, said magnetic heads being positioned on the drum and moved past the tape at such a rate that each head contacts the tape during an integral number of raster lines;

external circuits associated with the device; and signal collector means around the periphery of the drum whereby coupling is changed from one head to the next head during an interval between raster lines, said collector means coupling said rotating heads with said external circuits and comprising a plurality of segments on said drum, each associated with a magnetic head and rotating in synchronism with said drum, said collector means further comprising a stationary brush element connected to said external circuits, said segments and said brush element mutually coacting so that a signal is communicated between the external circuits and the particular head which is coacting with the tape at that instant, said segment and said brush element comprising inductances transferring signals by mutual coupling.

2. In a device according to claim 1, said inductances comprising spaced ferro-magnetic cores mutually forming two halves of a transformer sharing a common flux field.

3. A device for magnetically recording and scanning TV signals representing a picture raster having a definite number of lines on a storage tape on an integrally related number of adjacent parallel tracks disposed longitudinally of the tape, said device comprising: means for linearly advancing said tape; a rotary drum mounted tangent to the tape; a plurality of magnetic heads equal in number to the number of tracks and fixed in transversely offset annular succession around the surface of the drum, the heads being transversely out of alignment and coacting one at a time with the tape; drive means advancing the tape in contact with the drum; drive means rapidly rotating the drum on the tape at a rate such that within each longitudinally adjacent transverse zone of the tape all of the heads will be brought in cyclic succession into contact with said tape, each of said heads remaining in contact with its track on the tape substantially until the next successive head contacts another track on the tape, said magnetic heads being positioned on the drum and moved past the tape at such a rate that each head contacts the tape during an integral number of raster lines; external circuits associated with the device; and signal collector means around the periphery of the drum whereby coupling is changed from one head to the next head during an interval between raster lines, said collector means coupling said rotating heads with said external circuits and comprising a plurality of segments on said drum, each associated with a magnetic head and rotating in synchronism with said drum, said segments being in a plurality of rows, said collector means further comprising at least two stationary brush elements each cooperating with different rows of segments, said segments and said brush elements mutually coacting so that a signal is communicated between the external circuits and the particular head which is coacting with the tape at that instant, with segments of angularly adjacent heads being alternately connected to different rows.

4. In a device according to claim 3, switching means synchronized with the motion of the segments past the brushes, and connecting successive brushes with said external circuit.

References Cited in the file of this patent

UNITED STATES PATENTS

| | | |
|---|---|---|
| 2,170,751 | Gabrilovitch | Aug. 22, 1939 |
| 2,517,808 | Sziklai | Aug. 8, 1950 |
| 2,539,837 | Howell | Jan. 30, 1951 |
| 2,561,476 | Lang | July 24, 1951 |
| 2,675,427 | Newby | Apr. 13, 1954 |
| 2,773,120 | Masterson | Dec. 4, 1956 |
| 2,813,924 | Coutant et al. | Nov. 19, 1957 |
| 2,831,180 | Hasbrouck | Apr. 15, 1958 |

FOREIGN PATENTS

| | | |
|---|---|---|
| 1,059,964 | France | Mar. 30, 1954 |